US006933716B2

(12) United States Patent
Stettler et al.

(10) Patent No.: US 6,933,716 B2
(45) Date of Patent: Aug. 23, 2005

(54) MINIMIZED CROSS-SECTION SENSOR PACKAGE

(75) Inventors: Richard W. Stettler, Winter Haven, FL (US); Marshall E. Smith, Jr., Eaton, FL (US)

(73) Assignee: Wolff Controls Corporation, Winter Haven, FL (US)

( * ) Notice: Subject to any disclaimer, the term of this patent is extended or adjusted under 35 U.S.C. 154(b) by 0 days.

(21) Appl. No.: 10/995,962

(22) Filed: Nov. 23, 2004

(65) Prior Publication Data

US 2005/0116704 A1   Jun. 2, 2005

Related U.S. Application Data

(60) Provisional application No. 60/524,799, filed on Nov. 25, 2003, provisional application No. 60/524,919, filed on Nov. 25, 2003.

(51) Int. Cl.[7] .................................................. G01B 7/30
(52) U.S. Cl. .................. 324/207.25; 324/244; 324/252
(58) Field of Search .......................... 324/174, 207.13, 324/207.2–207.25, 244, 252, 260; 123/612, 123/617; 174/52.2

(56) References Cited

U.S. PATENT DOCUMENTS

| | | |
|---|---|---|
| 3,845,445 A | 10/1974 | Braun et al. |
| 4,922,197 A | 5/1990 | Juds et al. |
| 4,994,739 A | 2/1991 | Honda et al. |
| 5,121,289 A | 6/1992 | Gagliardi |
| 5,210,493 A | 5/1993 | Schroeder et al. |
| 5,278,496 A | 1/1994 | Dickmeyer et al. |
| 5,315,245 A | 5/1994 | Schroeder et al. |
| 5,381,089 A | 1/1995 | Dickmeyer et al. |
| 5,414,355 A | 5/1995 | Davidson et al. |
| 5,416,410 A | 5/1995 | Kastler |
| 5,451,868 A | 9/1995 | Lock |
| 5,488,294 A | 1/1996 | Liddell et al. |
| 5,500,589 A | 3/1996 | Sumcad |
| 5,508,611 A | 4/1996 | Schroeder et al. |
| 5,572,120 A | 11/1996 | Takaishi et al. |
| 5,581,179 A | 12/1996 | Engel et al. |
| 5,588,202 A | 12/1996 | Ehlers et al. |
| 5,631,557 A | 5/1997 | Davidson |
| 5,998,988 A | 12/1999 | Dickmeyer et al. |
| 6,025,562 A | 2/2000 | Shimizu et al. |
| 6,072,311 A | 6/2000 | Shinjo et al. |
| 6,169,254 B1 | 1/2001 | Pant et al. |
| 6,497,035 B1 | 12/2002 | Ratliff |
| 6,501,270 B1 | 12/2002 | Opie |
| 6,504,366 B2 | 1/2003 | Bodin et al. |
| 6,617,845 B1 | 9/2003 | Shafiyan-Rad et al. |
| 2003/0112158 A1 | 6/2003 | Babin |

*Primary Examiner*—Bot LeDynh
(74) *Attorney, Agent, or Firm*—Allen, Dyer, Doppelt, Milbrath & Gilchrist, P.A.

(57) ABSTRACT

A proximity sensor is carried within a small diameter package and includes a magnet for providing a desirable magnetic field for operation of proximity sensing circuitry carried along a central axis to allow for a maximum sensor signal output with no change due to a relative rotation angle between the sensor and a target being monitored. Electrical contact pins include an offset positioned near the central axis for permitting a desirable small gauge insulated wire to be connected the sensor.

24 Claims, 7 Drawing Sheets

US 6,933,716 B2

MINIMIZED CROSS-SECTION SENSOR PACKAGE

CROSS-REFERENCE TO RELATED APPLICATIONS

This application claims the benefit of U.S. Provisional Application having Ser. No. 60/524,799 for Offset Compensated Position Sensor, and U.S. Provisional Application having Ser. No. 60/524,919 for Minimized Cross-Section Sensor Package, both having filing date Nov. 25, 2003, the disclosures of which are herein incorporated by reference in their entirety, both commonly owned with the instant application.

FIELD OF THE INVENTION

The present invention relates to magnetic sensors and more particularly the packaging of said sensor to reduce package size and cost while providing optimum circuit sensitivity and improving durability.

BACKGROUND OF THE INVENTION

Sensing devices which are used to measure proximity or displacement of an object in a mechanical system are common in industry. As mechanical systems become more complex and costly there has developed a need to reduce the overall sensor package size and cost. Many mechanical systems employ sensors that detect the movement of a magnetically permeable object that is positioned in front of the sensor package. This patent addresses this type of configuration where it is necessary to insert or mount a sensor with a cylindrical package in an confined area and said sensor is required to detect the presence of an object that is moving in front of it. This sensor must have its sensing element located in the package such that it is perpendicular to the length of the package and positioned such it and the magnet are in close proximity to the target to allow for maximum sensitivity. Additionally the wires used to make external connections must be confined within the diameter of the sensor package.

Conventionally most magnetic sensors utilize a pre-packaged sensing element. For applications where size is not a consideration a prepackaged device is appropriate as handling the bare die can be costly. This prepackaged sensing element is placed into a larger assembly which then requires an even larger package to house the components. Complexity, size, durability, and cost are all issues for these types of sensors.

There have been attempts to simplify the packaging using unpackaged sensing elements but they fall short of addressing all the aforementioned criteria.

This patent provides for a sensor package that is designed in such a way that it provides for a minimum of parts thereby reducing the complexity and cost, provides for a unique configuration thereby reducing size while maintaining optimal sensitivity, and using materials that compliment and support each other providing for extreme durability.

SUMMARY OF THE INVENTION

A sensor according to the present invention may include an elongate magnet having a planar top surface at a proximal end, the planar top surface generally orthogonal to a central axis of the elongate magnet extending to a distal end, and a side wall extending therebetween, proximity sensing circuitry carried directly on the flat surface, the proximity sensing circuitry having at least two bond pads for providing an electrical connection therewith, the proximity sensing circuitry having a sensing element aligned along the central axis for providing a desirable sensor signal output independent of a rotation about the central axis, at least two nonmagnetic, electrically conductive elongate pins extending generally parallel to the central, the at least two elongate pins in a spaced relation to the side wall of the magnet, each of the at least two elongate pins having a proximal end proximate each of the at least two bond pads and a wire connection therebetween, wherein a distal end of the at least two elongate pins includes an offset extending around the magnet distal end and inward toward the central axis, and insulated conductive wires connected to each of the offsets and having at least a portion thereof extending along away from the magnet generally along the central axis thereof.

Each of the surfaces of the proximal ends of the at least two elongate pins and each of the at least two bond pads may have the wire connection therebetween lying within a common flat plane extending perpendicular to the central axis. A girth dimension for each offset may be greater than a girth dimension for each elongate pin, thus allowing a smaller gauge connection for each insulated wire to be connected thereto. In one embodiment, a first encapsulation secures the at least two electrically conductive elongate pins in a fixed position relative to the magnet and an enclosing thereof. Alternatively, a second encapsulation may enclose the proximity sensing circuitry and the first encapsulation therein while having only the insulated wires extending therefrom.

One embodiment of the invention may include a cylindrical sensor package that has its internal components and materials optimally configured and orientated as to maximize circuit sensitivity, and providing a minimized cross section for use in a mechanical systems which has limited space. The sensor package may contain an sensing element that is mounted directly to the center of a magnet then both are aligned so they are optimally placed in the center of the radial axis of the cylindrical sensor package to allow for the maximum sensor signal output with no change due to the relative rotation angle between the sensor and the target being sensed.

Electrical contact pins are shaped and positioned to make a connection from the sensing element at the front of the package to the external connecting wires at the opposite end. These pins may be made of a nonmagnetic material as not to cause interference with magnetic field and can be arranged in an circular manner around the sensing element and magnet to maintain an optimal small diameter package.

A molding process may be used to encapsulate the assembly providing the final cylindrical shape and giving the assembly a hermetic seal and protection from a harsh environment.

BRIEF DESCRIPTION OF THE DRAWINGS

For a fuller understanding of the invention, reference is made to the following detailed description, taken in connection with the accompanying drawings illustrating various embodiments of the present invention, in which.

DETAILED DESCRIPTION OF THE PREFERRED EMBODIMENTS

The present invention will now be described more fully hereinafter with reference to the accompanying drawings, in which preferred embodiments of the invention are shown. This invention may, however, be embodied in many different forms and should not be construed as limited to the embodiments set forth herein. Rather, these embodiments are provided so that this disclosure will be thorough and complete, and will fully convey the scope of the invention to those skilled in the art. Like numbers refer to like elements throughout, and prime notation is used to indicate similar elements in alternate embodiments.

Figure 1:
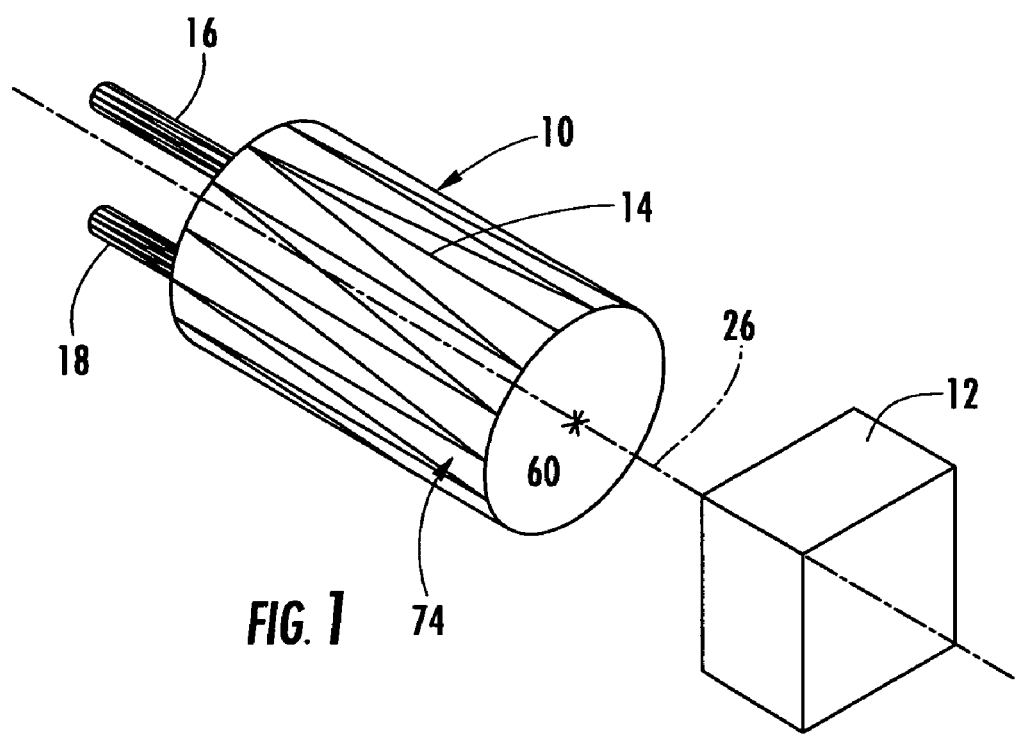
FIG. 1 is a partial perspective view illustrating a sensor having an outer encapsulation with the sensor orientated toward a target.

By way of example, mechanical systems such as internal combustion engines usually contain a significant number of moving objects. For instance, there are usually multiple cylinders in diesel engines utilizing fuel injectors each containing a moving valve or other object that must be monitored for efficient or safe operation. Each injector requires a separate sensor that is wired to a remotely located monitoring system. Referring initially to FIG. 1, a sensor 10 is herein described, by way of example, for monitoring a moving object 12, such as a portion of the fuel injector described above, with the sensor having a housing 14 desirably shaped and having its operating components sealed within the housing. Desirably large (small gauge) insulated wires 16, 18 extend from an aft portion of the housing 14 to allow the sensor to be conveniently and effectively located close to the object 12. By way of the example herein described, the sensor 10 may have a cylindrical shaped housing 14 for locating the housing within a drilled out cylindrical bore within an engine block.

Figure 2:
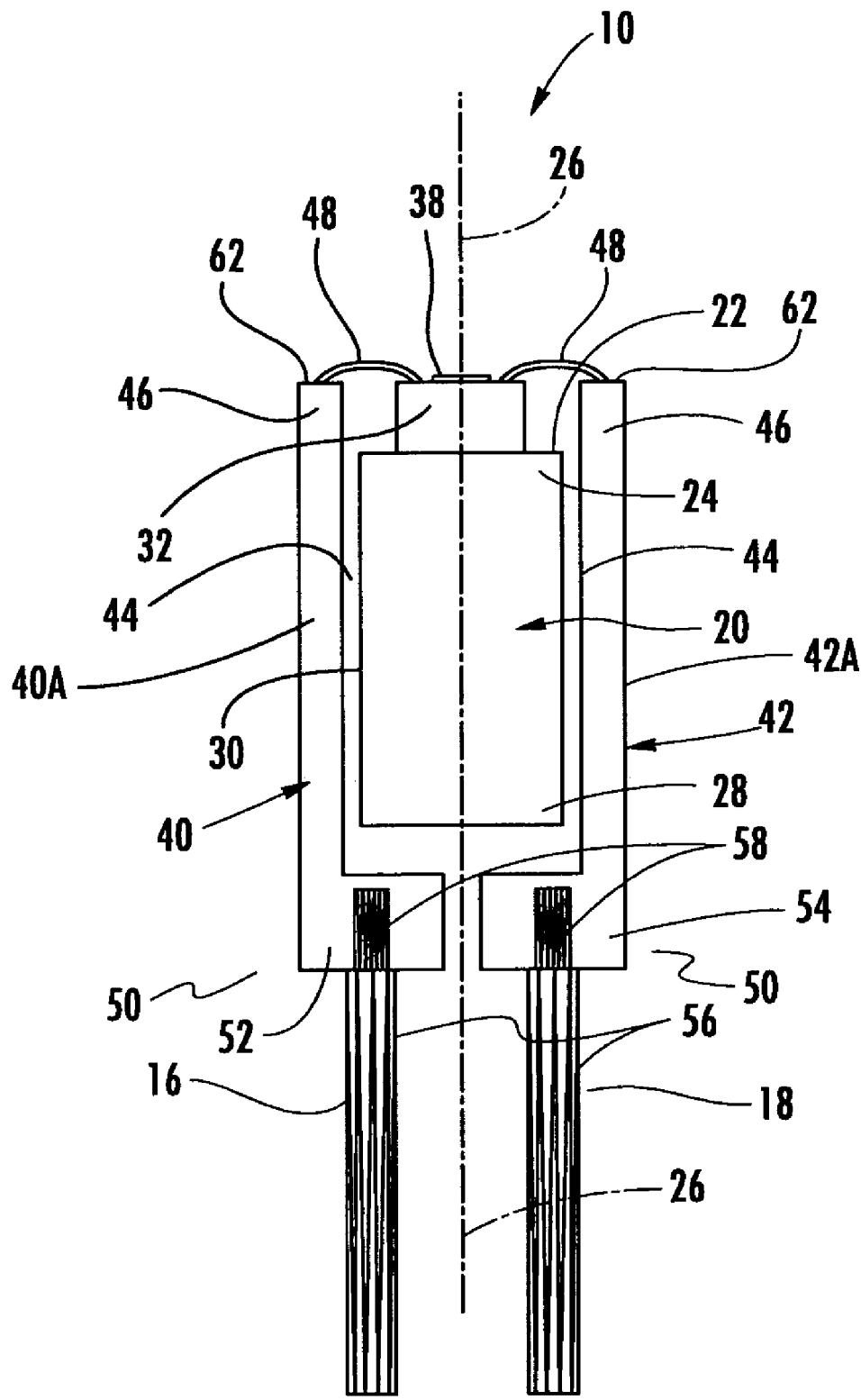
FIG. 2 is a partial side elevation view of a sensor illustrated without an inner or outer encapsulation for describing position, configuration, and connection of components.
Figure 3:
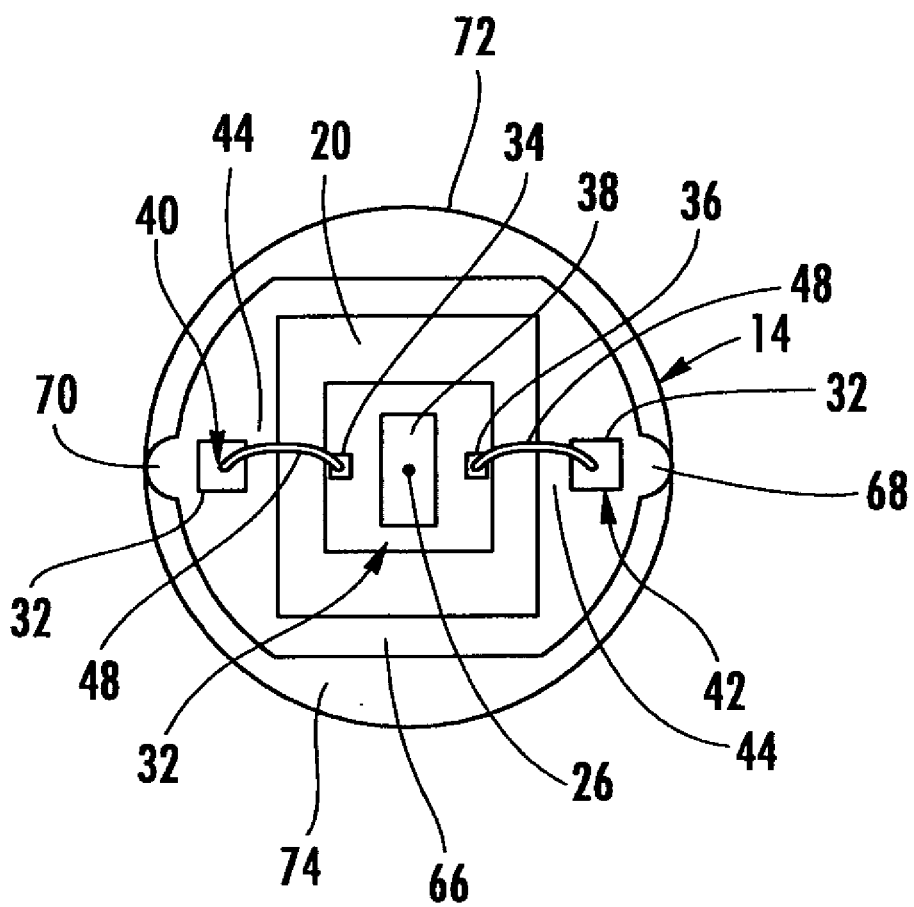
FIG. 3 is a partial top plan view of the sensor without the outer encapsulation illustrating element alignment by way of example.

With reference now to FIG. 2, there is illustrated one orientation and configuration of the sensor 10 according to the present invention that includes an elongate magnet 20 having a planar top surface 22 at a proximal end 24. The planar top surface 24 is generally orthogonal to a central axis 26 of the elongate magnet 20 extending through a distal end 28. A side wall 30 extends therebetween. Proximity sensing circuitry 32 is carried directly on the flat planar top surface 22. As illustrated with reference to FIG. 3, the proximity sensing circuitry 32 has at least two bond pads 34, 36 for providing an electrical connection therewith. A sensing element 38 is aligned along the central axis 26 for providing a desirable sensor signal output independent of a rotation about the central axis 26. At least two nonmagnetic, electrically conductive elongate pins 40, 42 extend generally parallel to the central axis in a spaced 44 relation to the side wall 30 of the magnet 20. Each of the pins 40, 42 has a proximal end 46 proximate each of the two bond pads 34, 36 and a wire connection 48 therebetween. A distal end 50 of the pins includes an offset 52, 54 extending around the magnet distal end 28 and inward toward the central axis 26. The insulated conductive wires 16, 18 as above described, are connected to each of the offsets 52, 54. At least a portion 56 of the wires 16, 18 extend away from the magnet generally along the central axis 26. As illustrated with continued reference to FIG. 2, a girth dimension for each offset 52, 54 is greater than a girth dimension for each elongate pin portion 40A, 42A extending generally along the axis 26, thus allowing a smaller gauge connection 58 for each insulated wire 16, 18.

For the embodiment herein described by way of example, the proximity sensing circuitry 32, a sensor chip, includes a sensor chip orientated so that the sensing element 32 is orientated in the direction of the sensor face 60 and thus the object 12 along the central axis 26, as illustrated with reference again to FIGS. 1–3. The sensor chip 32 may be attached to the magnet 20 with thermally conductive epoxy. The size, shape and position of the magnet 20 is such that it will deliver a maximum magnetic field to the sensing element 38. For the embodiment herein described, no mounting substrate is used between the magnet 20 and the sensor chip 32. This reduces the package length and provides for maximum magnetic field to the sensing element 38 and the object (a target) 12. If necessary to prevent shorting, a coating may be applied to the magnet 20 to insulate it from the sensor chip 32 or other components.

The conductive pins 40, 42 are used to deliver the sensor chip signal output to the insulated wires 16, 18. For the embodiment herein described, the pins 40, 42 are made from a non-magnetic material so that during assembly of the sensor components, the magnet 20 will not move the pins out of position or cause the magnet itself to move out of position. In addition, the pins 40, 42 will not interfere with the magnetic field of the magnet 20, and cause a disruption of the magnetic field, reducing the sensor sensitivity and measuring range.

Figure 4:
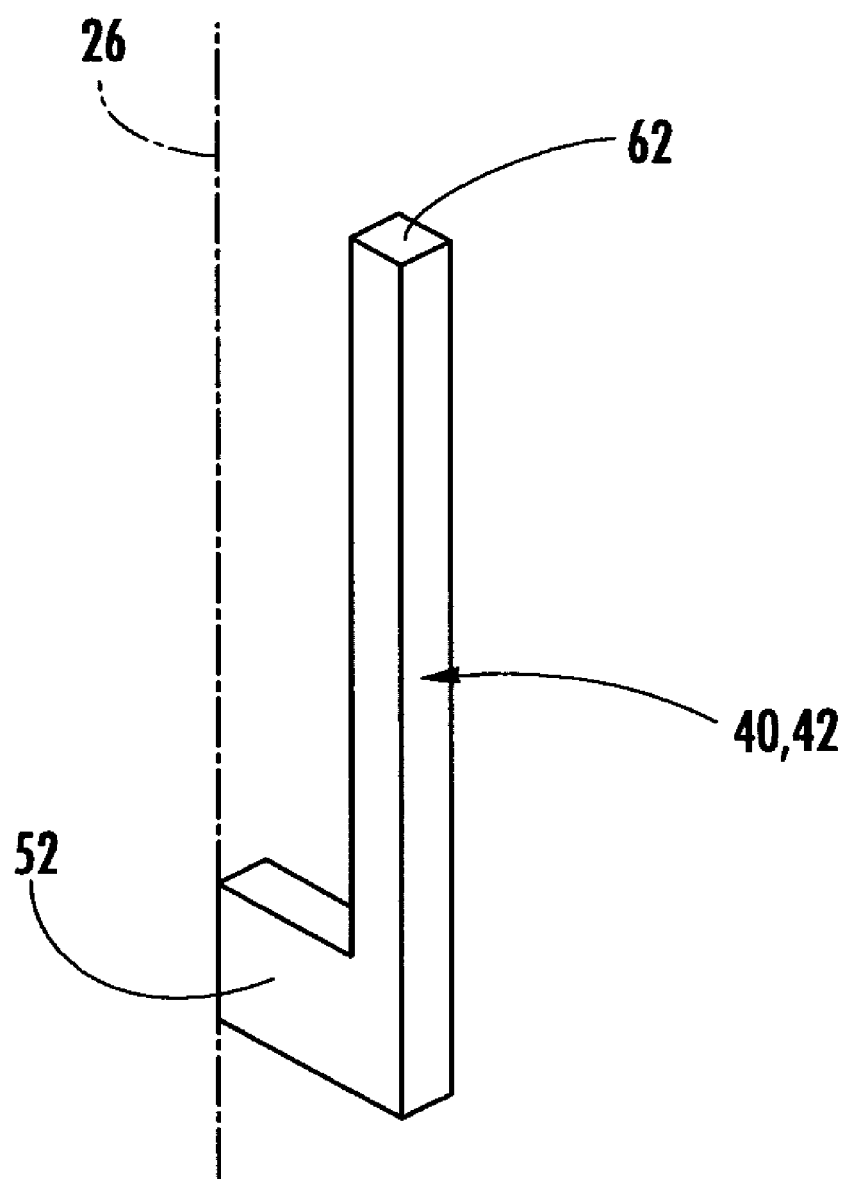
FIG. 4 is a perspective view of one conductive pin useful with the embodiments herein described, by way of example.

As illustrated with reference again to FIG. 2, and to FIG. 4, a pin wire bonding surface 62 is flat so that the wire connection 48 may be made using standard wire bonding methods such as thermal compression. This pin wire surface 62 is in the same plane as the sensor chip bonding pads 34, 36 so that the wire bonds will be short, for providing a reduced package length, increasing the sensor sensitivity, with the amount of wire loop low, to reduce the potential of wire bond failure.

As above illustrated with reference to FIG. 2, the conductive pins 40, 42 runs along the side of and terminate behind the distal end 28 of the magnet 20 in a manner that keeps the overall package girth (diameter for the cylindrical embodiment herein described by way of example) optimized to a minimum. As above illustrated, the pins 40, 42 are used to provide a connection between the proximity sensing circuitry 32 to the insulated wires 16, 18 through the wire connections 48.

Figure 5:
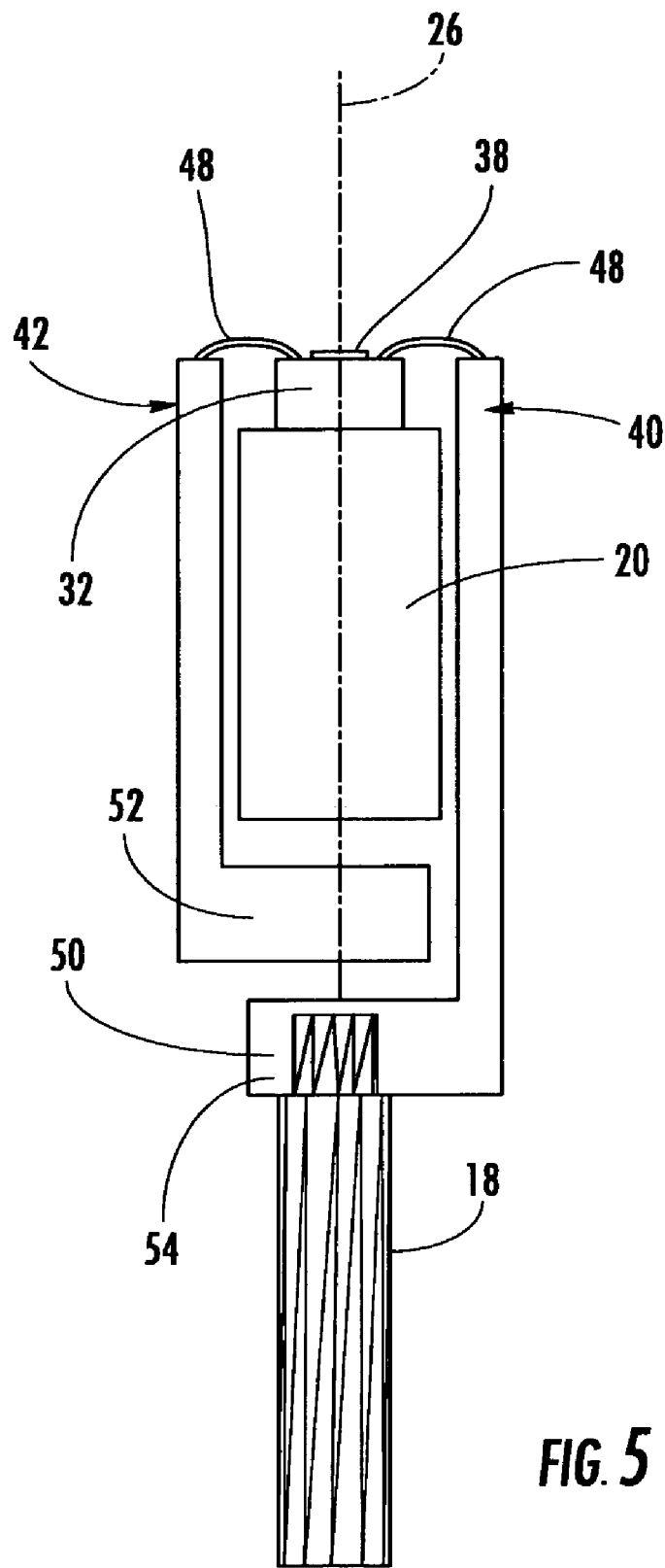
FIG. 5 illustrates an alternative embodiment for configuring the conductive pins.

In an alternate embodiment, and as illustrated with reference to FIG. 5, the pins 40, 42 may be oriented with the offsets 52, 54 displaced along the central axis 26 for connecting the insulated wires 16, 18 thereto. The offsets 52, 54 may also be off-centered to allow for the largest insulated wire 16, 18 while keeping the sensor girth to a minimum. The pin offset configuration allows for the external connecting wires to have a maximum diameter for current carrying capacity. By staggering the pins, a larger pin offset may be employed, and thus a larger insulated wire. As illustrated with reference to FIG. 6, additional conductive pins 64 may be staggered around the central axis 26 without increasing the sensor package size.

Figure 6:
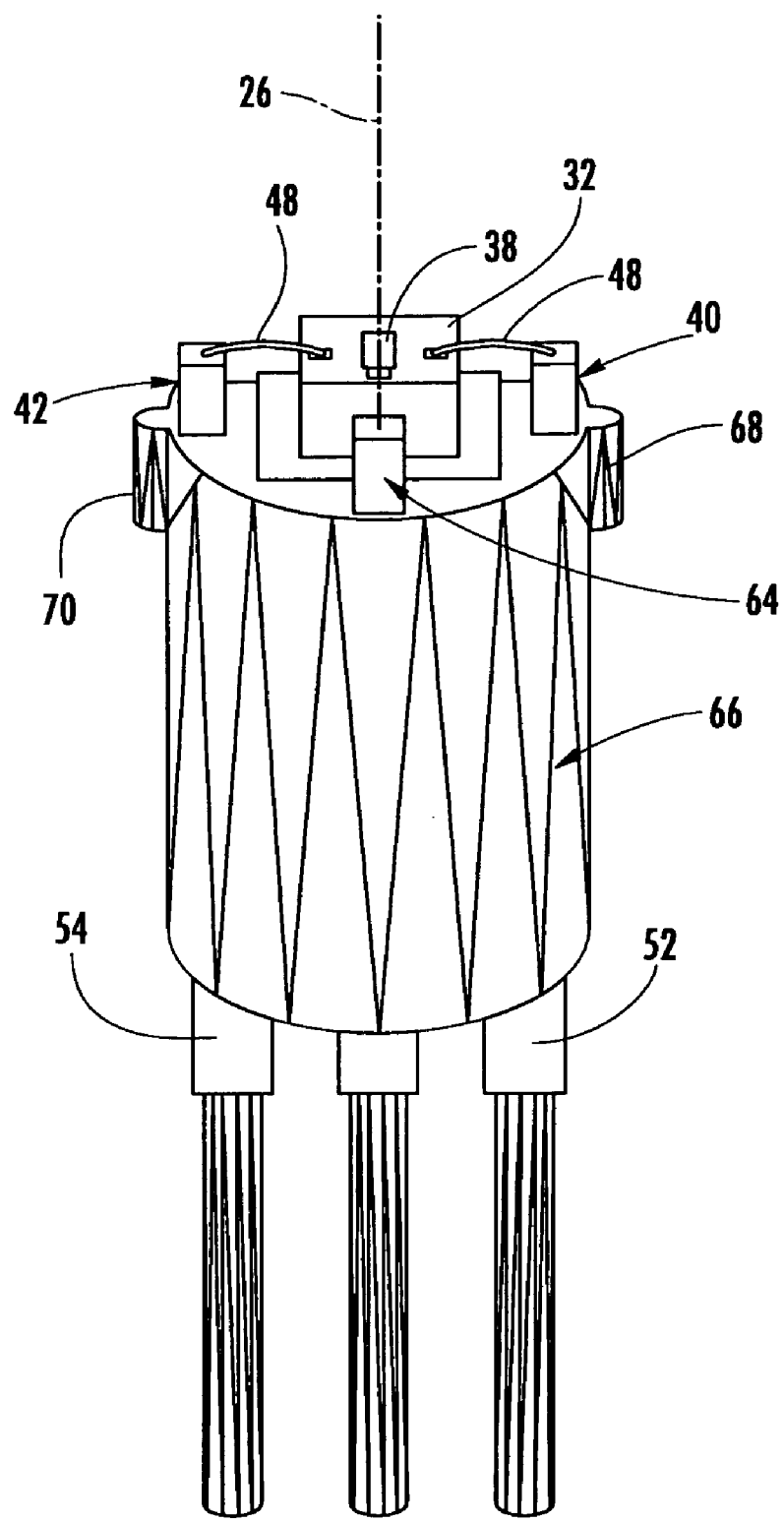
FIG. 6 is a partial perspective view of a sensor illustrating an alternate pin arrangement.
Figure 7:
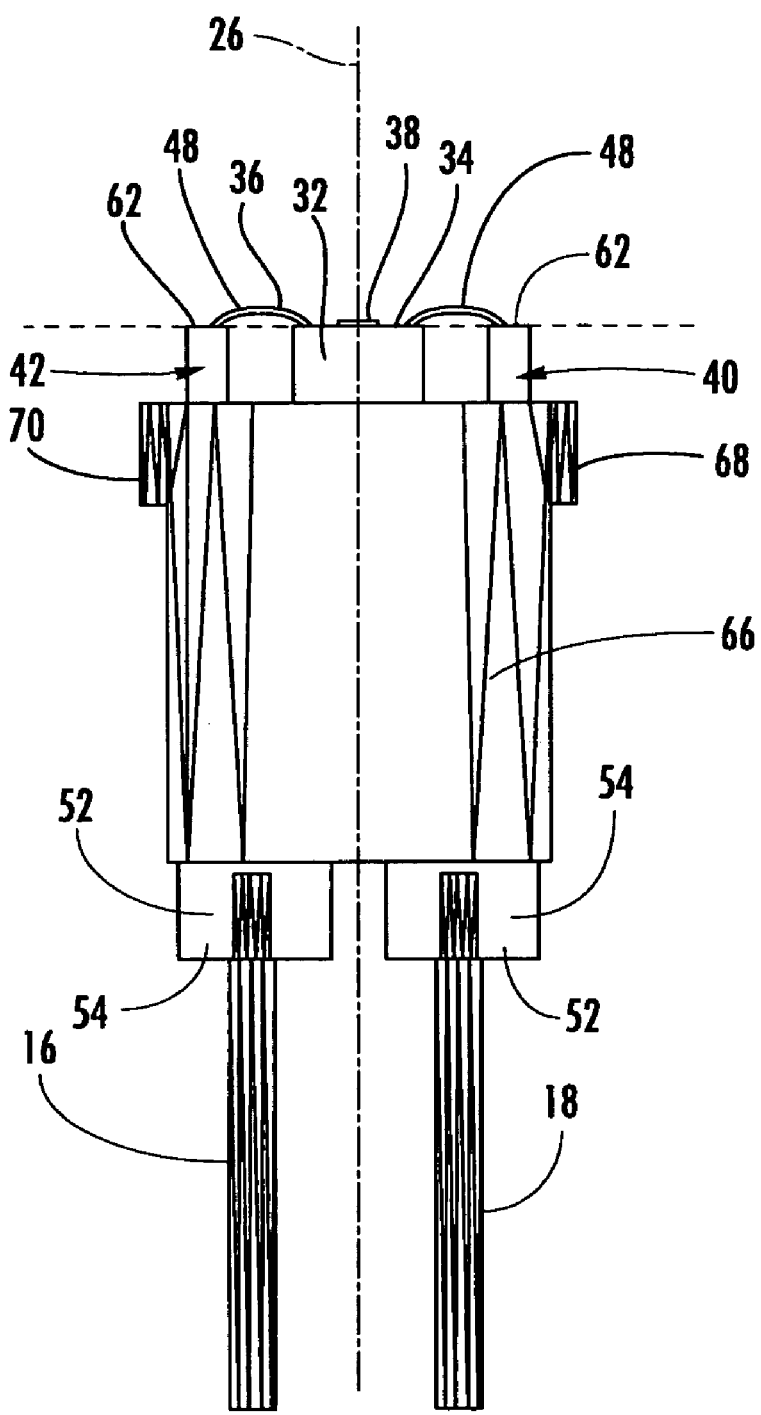
FIG. 7 is a partial side elevation view of the sensor with the inner encapsulation applied.

With reference again to FIG. 6 and to FIG. 7, for the embodiments herein described by way of example, an inner encapsulation 66 is used to fix the magnet 20 and pins 40, 42 (earlier described with reference to FIG. 2) into place. The inner encapsulation 66 also provides for an insulation barrier between the conductive pins 40, 42 and the magnet 20 for preventing an electrical short between them. In addition, the encapsulation 66 includes alignment elements 68, 70 for providing structural support to the area around conductive pins 40, 42 and for alignment in a mold 72 as illustrated with reference again to FIG. 3 for applying the an outer encapsulation 74. The mold 72 may remain as the housing 14 outer shell, may be removed to have the outer shell be the outer surface of the outer encapsulation, as may be desired to meet the needs of the sensor use. The alignment elements 68, 70 feature provides at least a two axis constraint ensuring that the sensor chip 32 and magnet 20 remain centered within the sensor 10 along the central axis 26 during the application of the outer encapsulation 74. As earlier described, FIG. 6 illustrates one alternate embodiment in which another pin 64 is added.

With reference again to FIG. 1, the outer encapsulation 74, which encapsulates the entire assembly described with reference to FIGS. 6 and 7, may be in the cylindrical form, or as desired, keeping the central axis 26 as a reference. This outer encapsulation 74 bonds to the inner encapsulation 66 in such a manner that creates a bond that is as strong as an encapsulation without a joint which provides for an extremely strong sensor packaging with excellent resistance to extreme environmental conditions and industrial fluids.

Many modifications and other embodiments of the invention will come to the mind of one skilled in the art having the benefit of the teachings presented in the foregoing descriptions and the associated drawings. Therefore, it is understood that the invention is not to be limited to the specific embodiments disclosed, and that modifications and embodiments are intended to be included within the scope of the appended claims.

That which is claimed is:

1. A sensor comprising:
    an elongate magnet having a planar top surface at a proximal end, the planar top surface generally orthogonal to a central axis of the elongate magnet extending to a distal end, and a side wall extending therebetween;
    proximity sensing circuitry carried directly on the flat surface, the proximity sensing circuitry having at least two bond pads for providing an electrical connection therewith, the proximity sensing circuitry having a sensing element aligned along the central axis for providing a desirable sensor signal output independent of a rotation about the central axis; and
    at least two nonmagnetic, electrically conductive elongate pins extending generally parallel to the central, the at least two elongate pins in a spaced relation to the side wall of the magnet, each of the at least two elongate pins having a proximal end proximate each of the at least two bond pads and a wire connection therebetween, wherein a distal end of the at least two elongate pins includes an offset extending around the magnet distal end and inward toward the central axis.

2. The sensor according to claim 1, further comprising insulated conductive wires connected to each of the offsets and having at least a portion thereof extending along away from the magnet generally along the central axis thereof.

3. The sensor according to claim 1, wherein each of surfaces of the proximal ends of the at least two elongate pins and each of the at least two bond pads having the wire connection therebetween lie within a common flat plane extending perpendicular to the central axis.

4. The sensor according to claim 1, wherein a girth dimension for each offset is greater than a girth dimension for each elongate pin, thus allowing a smaller gauge wire connection thereto.

5. The sensor according to claim 1, wherein each of the offsets is directed radially inward toward the central axis.

6. The sensor according to claim 1, further comprising a first encapsulation securing the at least two electrically conductive elongate pins in a fixed position relative to the magnet and an enclosing thereof.

7. The sensor according to claim 6, further comprising a second encapsulation enclosing the proximity sensing circuitry and the first encapsulation therein while having only the insulated wires extending therefrom.

8. The sensor according to claim 7, wherein a seamless bond is formed between the first and second encapsulations, thus providing structural support therewith and preventing an environment within which the sensor operates to contact the proximity sensing circuitry.

9. The sensor according to claim 7, further comprising alignment elements operable between the first and second encapsulations for providing at least a two axis alignment therebetween.

10. The sensor according to claim 7, wherein the second encapsulation comprises an outermost surface having a cylindrical shape.

11. The sensor according to claim 1, wherein the proximity sensing circuitry comprises a sensor chip having an electrically insulated surface for attaching the chip to the magnet.

12. A sensor comprising:
    a housing having a generally symmetric shape about a central axis thereof, the housing having a proximal end for directing toward an object to be monitored;
    an elongate magnet carried within the housing along the central axis thereof;
    proximity sensing circuitry carried within the housing proximate the proximal end thereof, the proximity sensing circuitry having at least two bond pads for providing an electrical connection therewith, the proximity sensing circuitry having a sensing element aligned along the central axis; and
    at least two nonmagnetic, electrically conductive elongate pins carried within the housing along an outer portion thereof, the at least two elongate pins in a spaced relation to the magnet, each of the at least two elongate pins having a proximal end proximate each of the at least two bond pads and an electrical connection therebetween, each of the elongate pins further having an offset at a distal end extending inward toward the central axis.

13. The sensor according to claim 12, further comprising insulated conductive wires having one end thereof connected to the offset and an opposing end extending longitudinally outward from a distal end of the housing, wherein a girth dimension for each offset is greater than a girth dimension for each elongate pin portion extending along the outer portion of the housing for allowing a smaller gauge wire connection for each insulated wire to be connected thereto.

14. The sensor according to claim 12, wherein the elongate magnet includes a planar top surface at the proximal end positioned orthogonal to the central axis.

15. The sensor according to claim 12, wherein the sensing element is carried at the central axis for providing a signal output from the proximity sensing circuitry independent of a rotation of the housing about the central axis relative to the object being monitored.

16. The sensor according to claim 12, wherein each of surfaces of the proximal ends of the at least two elongate pins and each of the at least two bond pads having the electrical connection therebetween lie within a common flat plane.

17. The sensor according to claim 12, further comprising an insulating material filling voids within the housing and securing the at least two electrically conductive elongate pins in a fixed position relative to the magnet.

18. A sensor comprising:
a magnet;
proximity sensing circuitry having a sensing element aligned along a central axis of the magnet for providing a sensor signal output independent of a rotation about the central axis;
at least two electrically conductive pins having a proximal end proximate the proximity sensing circuitry, the at least two elongate pins in a spaced relation to the magnet, wherein each of the at least two pins has a distal including an offset extending around a distal portion of the magnet and inward toward the central axis for an electrical connection thereto; and
an encapsulation securing the at least two electrically conductive pins in a fixed position relative to the magnet, the encapsulation further enclosing the proximity sensing circuitry while having only the insulated wires extending therefrom.

19. The sensor according to claim 18, further comprising insulated conductive wires connected to each of the offsets and having at least a portion thereof extending along and the central.

20. The sensor according to claim 18, wherein the magnet includes a planar surface generally orthogonal to the central axis, and wherein the proximity sensing circuitry is carried thereby.

21. The sensor according to claim 18, wherein the proximity sensing circuitry includes at least two bond pads for providing an electrical connection to the electrically conductive pins.

22. The sensor according to claim 21, wherein each of surfaces of the proximal ends of the at least two electrically conductive pins and each of the at least two bond pads lie within a common flat plane, and wherein a wire bonding connection is made therebetween.

23. The sensor according to claim 18, wherein the encapsulation is formed through a first encapsulating of the magnet and the electrically conductive pins and a second seamless bond of the first encapsulation with a second encapsulation providing structural support therewith and preventing an environment within which the sensor operates to contact the proximity sensing circuitry.

24. The sensor according to claim 22, wherein alignment elements operable between the first and second encapsulations providing for at least a two axis alignment therebetween during the second encapsulating process.

* * * * *